United States Patent [19]

Watson

[11] Patent Number: 5,616,030
[45] Date of Patent: Apr. 1, 1997

[54] FLIGHT SIMULATOR EMPLOYING AN ACTUAL AIRCRAFT

[76] Inventor: Bruce L. Watson, 339 Main Road, P.O. Box 1024, Hudson, Quebec, Canada, J0P 1H0

[21] Appl. No.: 252,464

[22] Filed: Jun. 1, 1994

[51] Int. Cl.$^6$ .................................................. G09B 9/00
[52] U.S. Cl. .............................. 434/38; 434/29; 434/30; 434/32; 434/45
[58] Field of Search ............................... 434/29, 30, 32, 434/33, 35, 37, 38, 45, 50, 51

[56] References Cited

U.S. PATENT DOCUMENTS

| | | |
|---|---|---|
| 3,546,350 | 12/1970 | Reynolds . |
| 3,886,334 | 5/1975 | Cummings et al. . |
| 4,109,886 | 8/1978 | Tribken et al. . |
| 4,214,381 | 7/1980 | Clark et al. . |
| 4,490,117 | 12/1984 | Parker . |
| 4,500,868 | 2/1985 | Tokitsu et al. . |
| 4,642,774 | 2/1987 | Centala et al. . |
| 4,673,356 | 6/1987 | Schmidt . |
| 4,781,594 | 11/1988 | Metcalf . |
| 5,009,598 | 4/1991 | Bennington . |
| 5,017,141 | 5/1991 | Relf et al. . |
| 5,162,828 | 11/1992 | Furness et al. . |
| 5,240,416 | 8/1993 | Bennington . |

*Primary Examiner*—Richard J. Apley
*Assistant Examiner*—Glenn E. Richman
*Attorney, Agent, or Firm*—Ronald S. Kosie; Robert Brouillette

[57] ABSTRACT

A flight simulator kit which includes at least a simulated flight attitude control member, the simulated flight attitude control member being capable of mimicking the movements of an actual aircraft flight attitude control member. A visual display system is also provided for receiving input signals and in response thereto visually display a video simulation of a plurality of simulated aircraft flight instruments mimicking the movements and responses of actual aircraft flight instruments. The kit further includes a computer for receiving the output signals from the simulated control system and in response thereto for providing the input signals to the visual display system. The kit may be used to set up a simulator in an actual aircraft not in flight.

4 Claims, 5 Drawing Sheets

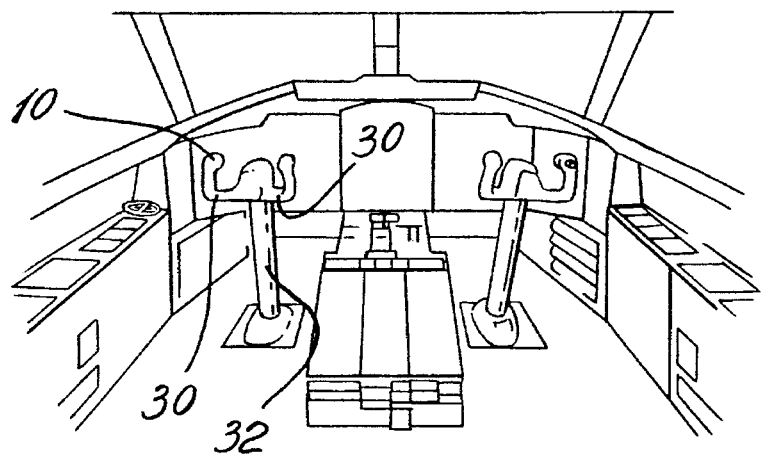
Fig. 2
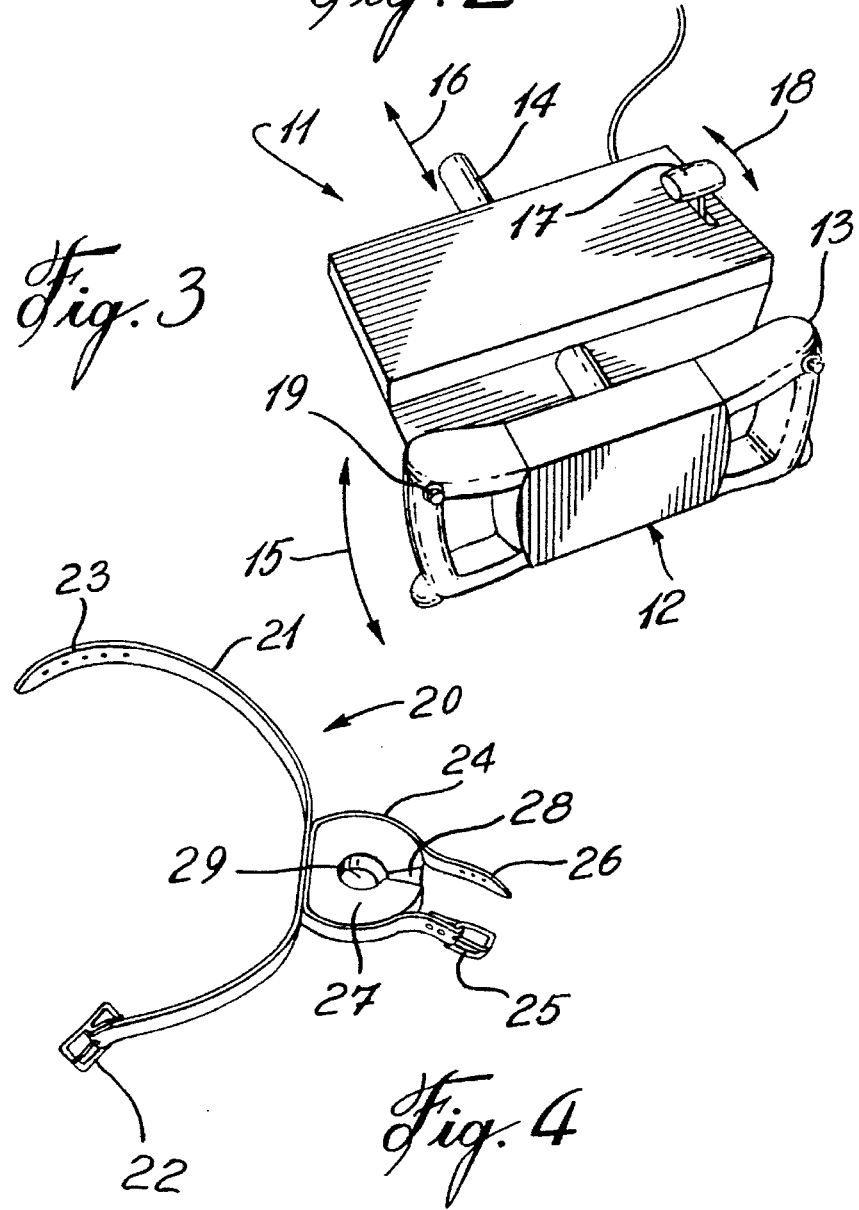
Fig. 3
Fig. 4

FLIGHT SIMULATOR EMPLOYING AN ACTUAL AIRCRAFT

The present invention relates to flight simulator devices, systems and the like, for training pilots and flight crew members. It, in particular, relates to a flight system which may exploit an actual aircraft as part of a simulator system.

Flight simulators are well known devices for use in the training of pilots and crew members.

Ground based simulators, for example, are known which comprise separate structures which are designed to mimic not only the interior of an aircraft cockpit but also aircraft motion, sounds and field of vision. Such ground based simulators have been used to train pilots to learn basic attitude and instrument navigation procedures. Such ground based simulators are, however, relatively expensive to make given that they are usually made with a view to providing as realistic an environment as possible. These types of simulators may also require relatively expensive maintenance and relatively frequent repair.

In order to provide a relatively less expensive but realistic training experience, it has been suggested to use an actual operable aircraft not in flight (i.e. on the ground) as a part of a simulation system instead of a separate simulated aircraft cockpit environment. These types of systems are, for example, shown in U.S. Pat. Nos. 5,009,598 and 5,240,416. The systems disclosed in these patents exploit a computer which may be removeably installed in an aircraft. These patents, however, teach that an aircraft's own cockpit flight attitude control system must be used as part of the flight simulator system; the cockpit flight attitude control system for example controls various aircraft flight control surfaces such as ailerons. This requirement means that objects foreign to the aircraft (i.e. motion sensors) must be intimately attached to the flight attitude control member(s) such that movement of a control member(s) causes the sensor(s) to output control signals indicative of the operation of the actual flight control member(s).

The attachment of sensor members to a flight attitude control member so as to detect operation thereof presents the possibility that the flight control system of the aircraft may be compromised by the use of such sensors. Thus, for example, a flight attitude control member may be damaged during the installation or removal of the sensors; the presence of the sensors may damage the control member as it is being moved (e.g. the sensor may jam up against the control member and damage it). More importantly, the presence of such so attached foreign bodies in an aircraft leaves open the possibility that one or more of the foreign objects may be inadvertently left in place and subsequently interfere with the proper functioning of the control member when the aircraft is in flight and thus endanger or put at risk the lives of all on board the aircraft. Also, for example, in accordance with the systems, as taught in these patents, instrumentation in the cockpit must also be altered by attaching simulator instrument overlays to the instrument panel(s) so as to mask actual aircraft instruments; the instrument overlays are configured so as to be able to simulate the responses of the aircraft's instruments masked thereby. The above mentioned risks are amplified by the presence of such instrument overlay installations. Additionally, for example these patents, teach the disposition of interactive lifting jacks for inducing movement of the airplane which may if not properly positioned expose element of the aircraft to unwanted or even dangerous stress.

There is an additional hazard which may present itself if an actual aircraft flight attitude control member is used as part of the simulator system. The movement of the actual flight attitude control member may cause an outside element of the aircraft such as an aileron to abruptly move. If at the same time an unsuspecting person were to be walking by the aircraft in the vicinity of the aileron such a person could be grievously injured or even killed by the moving aileron.

Thus, it may be extremely difficult to persuade a person(s) responsible for the maintenance and safety of an aircraft to allow the installation of such foreign objects (i.e. sensors, overlays, motion jacks and the like) in, on or about an aircraft.

It would therefor be advantageous to have a means for setting up a flight simulator system which does not require that the actual aircraft control systems (e.g. flight control column or wheel) be used as part of the simulator system.

It would also be advantageous to have a means for setting up a flight simulator system which does not require that the actual aircraft instruments, aircraft structural features (e.g. wings, ailerons, etc) and the like, be used as part of the simulator system.

It would also be advantageous to have a flight simulator system which includes an actual aircraft not in flight (i.e. on the ground) and which does not require that the actual aircraft control systems (e.g. flight control column or wheel) be used as part of the simulator system.

STATEMENT OF INVENTION

The present invention in one general aspect provides a flight simulator kit comprising a simulated aircraft cockpit control system comprising one or more simulated moveable cockpit control members, said simulated aircraft control system being capable of providing output control signals indicative of operation of said simulated cockpit control members, said simulated moveable control members including at least a simulated flight attitude control member, said simulated flight attitude control member being capable of mimicking the movements of an actual aircraft flight attitude control member;

a visual display system for receiving input signals and in response thereto visually display a video simulation of a plurality of simulated aircraft flight instruments mimicking the movements and responses of actual aircraft instruments;

and a computer for receiving said output signals from said simulated control system and in response thereto for providing said input signals to said visual display system.

As used herein it is to be understood that the word cockpit includes the flight deck of an aircraft and visa-versa.

A kit in accordance with the present invention may be used to set up a flight simulation system.

Thus, in accordance with the present invention, a flight simulator kit may, for example, not only consist of the simulated aircraft cockpit control system, the visual display system, the computer but may also, as desired, include any means for electrically coupling the components of the system together.

The kit may be used in an aircraft. In the case of a flying aircraft the installation of the simulator in the aircraft would of course have to be such as not to interfere with the normal functioning of the aircrafts controls, etc. (e.g. the simulated control system would not normally be attached to the actual flight wheel as shall be discussed below). Preferably, however, the aircraft would be one not in flight (i.e. so that the simulated control system may be attached to the actual flight wheel as shall be discussed below). Although the kit is particularly discussed herein in relation to its use in the cockpit of an actual aircraft, it could of course be used to set up a flight simulator elsewhere in an aircraft or even in a ground based classroom.

However, in accordance with the present invention, the flight simulator kit is advantageously configured for a flight simulator system including an actual aircraft. The kit may be configured such that the various components are destined to be more or less permanently installed in an aircraft. Preferably, however, a kit may be configured such that, for example, the simulated cockpit control system and/or visual display system may be removably installable in an aircraft; the simulated control system may, for example, be configured so as to be removeably installable in said aircraft. If desired, the flight attitude control member may, for example be removably mountable on an actual flight control wheel or yoke of an actual flight attitude control member of an aircraft; if the simulated control system includes other types of control members (e.g. a throttle control member) such members may, if desired, be mounted elsewhere in the cockpit rather than on the actual control wheel. More particularly, however, a simulator kit may, for example, be configured such that the simulated control system as a whole is removeably attached to the actual flight control wheel; i.e. all of the simulated control members may be so attached. The simulated members may be removeably attached to the wheel in any suitable or desired fashion.

It is also to be understood herein that the visual display system may, as desired, be removeably disposable or disposed in an aircraft and to facilitate this aspect the display system may, for example, take the form of a removeable head mountable visual display system worn by the trainee pilot as shall be described below.

The computer may also be removeably installable in the aircraft and in this respect the computer may, preferably be of the portable or notebook type. However, the computer may, for example, if necessary or desired, be disposable or disposed outside of the aircraft and be appropriately electrically connected to the other elements of the simulator when the simulator is to be used.

In accordance with another general aspect of the present invention there is provided a flight simulator system comprising an actual aircraft not in flight;

a simulated aircraft cockpit control system comprising one or more simulated moveable cockpit control members, said simulated aircraft control system being capable of providing output control signals indicative of operation of said simulated cockpit control members, said simulated moveable control members including at least a simulated flight attitude control member, said simulated flight attitude control member being capable of mimicking the movements of an actual aircraft flight attitude control member;

a visual display system for receiving input signals and in response thereto visually display a video simulation of a plurality of simulated aircraft flight instruments mimicking the movements and responses of actual aircraft instruments;

and a computer for receiving said output signals from said simulated control system and in response thereto for providing said input signals to said visual display system.

The simulated aircraft cockpit control system may comprise any known simulation system which is configured so as to be able to cooperate with a computer system and associated flight simulation software such that visual simulations of flight instruments may be produced in response to signals sent by the simulated control system.

In accordance with the present invention the simulated aircraft control system must include a simulated flight attitude control member. The simulated flight attitude control member may for example be configured so as to mimic a member selected from among any of the actual aircraft control members which can control the flight attitude (i.e. yaw, pitch, roll and the like) of an aircraft; the simulated attitude member may, for example, be configured to mimic a flight control column, a flight control yoke or wheel, a flight control column and rotary wheel/yoke combination and the like.

The simulated control system may, however, if desired also include other types of simulated moveable cockpit control members. Thus, for example, the simulated moveable cockpit control members may include a simulated moveable throttle control member, the simulated throttle control member being capable of mimicking the movements of an actual aircraft throttle control member. By way of an additional example, the simulated moveable cockpit control members may include a simulated moveable trim control member, the simulated trim control member being capable of mimicking the movements of an actual aircraft trim control member.

A suitable device which may be used to provide a simulated flight attitude control member, as well as a simulated throttle control member and a simulated trim control member, is sold by CH Products, Vista, Calif., U.S.A. under the trade name "Virtual Pilot".

In accordance with the present invention the visual display system may take on any desired form provided that it may be appropriately electrically connected to the computer such that in response to computer signals, it may visually display a video simulation of a plurality of simulated aircraft flight instruments mimicking the movements and responses of actual aircraft instruments. The video display system may, for example, comprise any known video monitor used with computers. Preferably, however, for ease of installation and use of the simulator system, the video display system may be a removable head mountable visual display system (i.e. a video display system configured, for example, as eyewear, such as glasses, goggles, a visor, etc.); such head mounted viewing systems are known. Head mounted viewing systems are, for example, disclosed in U.S. Pat. No. 5,162,828; the entire contents of this patent are incorporated herein by reference. The use of a head mountable display system is advantageous since it obviates the need to install a relatively bulky video monitor in an aircraft or to place simulation overlays over the real instruments.

Suitable eyewear type video display systems may be obtained from Virtual Vision Inc. Redmond, Wash., U.S.A.; this company, for example, is offering a monocular system under the trade name View 100; the company is also offering a binocular/stereoscopic system as well. The monocular system provides a large image in front of one eye slightly below the normal field of vision the eye. The eye used to see the image is the dominant eye. The determination of which eye is dominant is described by the company literature; the dominant eye is the eye that the brain gives priority to whatever image is viewed by the dominant eye so that the image seems to appear before both eyes. The binocular system provides a larger image in front of both eyes. The structure and workings of these types of eyewear display systems is generally described in the above mentioned U.S. Pat. No. 5,162,828. These systems include a miniature video display and a reflective optical system which reflects an image on the video display so that it appears to be at a predetermined distance from the wearer. The eyewear from Virtual Vision Inc. accepts video inputs of the VHS, Super-VHS, VGA and SuperVGA types; this eyewear may also incorporate a set of audio earphones which may be used to receive computer signals for simulating cockpit sounds.

The computer and associated flight simulator software are preferably selected so as to provide a satisfactory real time feel to the flight simulation; i.e. the perceived reaction of the simulated instruments in response to operation of the simulated attitude control member as shown by the visual display system has a satisfactory real look and feel with respect to actual aircraft instruments. In this respect the computer may for example have 66 megahertz CPU. As mentioned above the computer may, preferably, be of the portable or notebook type; a suitable computer is a 486DX2-66 class computer called "N500 Notebook Computer" from Noteable Computers Inc., California, U.S.A.

The present system may employ any known flight simulation software which can be used to generate the required video simulation of a plurality of simulated flight instruments. The software used must of course be compatible with the components of the system; i.e. the software is chosen so as to be able to run on the chosen computer.

A suitable flight simulation software is available from Azure Technology, Virginia, U.S.A. under the name Elite Jet 3.0 (third edition, Revision D—April 1993). The Elite Jet software program can be used to create a satisfactory simulation of flight instruments for medium to heavy jet aircraft; the program is designed to simulate the instrument panel of a real MD-80 class of jet and its aerodynamic characteristics. All of the displayed simulated instruments behave like their real counterparts in response to changing conditions of an aircraft in flight, e.g. in response to operation of the simulated flight attitude control member.

In order to obtain satisfactory visual images of the instruments (i.e. readable instruments) it may be necessary to increase the resolution of the displayed instruments by choice of suitable hardware or software system components. Thus for example a software program called "VV Magicsoft" from Virtual Vision Inc., Redmond, Wash., USA, may be used in conjunction with the above mention Elite Jet program so as to magnify the images presented to the trainee pilot, e.g. magnify the instruments and their readings so as to enhance the readability of the simulated instrument panel.

A flight simulator kit or simulator system in accordance with the present invention advantageously includes an independent means for providing electric power for the computer, the visual display system and/or the simulated cockpit control system. In the context of the present invention it is to be understood that a reference to independent electric power means signifies that such type of power means is independent of the aircraft's own electric power systems. The independent power means may, for example, take the form of one or more electric batteries, a separate internal combustion electric generator (which can be located outside of the aircraft and connected to the components of the simulator by an appropriate electric cord), an electric cord (which can connect the components of the simulator system to an electric power source disposed outside of the aircraft) and the like.

In drawings which illustrate an example embodiment of the present invention:

FIG. 2 is a schematic illustration of an aircraft cockpit showing the actual flight attitude control member;

FIG. 3 is a schematic drawing of a simulated aircraft cockpit control system obtainable form CH Products, Vista, Calif., U.S.A. under the trade name "Virtual Pilot".

FIG. 4 is a schematic illustration of an attachment member for attaching the control system shown in FIG. 3 to an actual control wheel of an aircraft;

Figure 1:
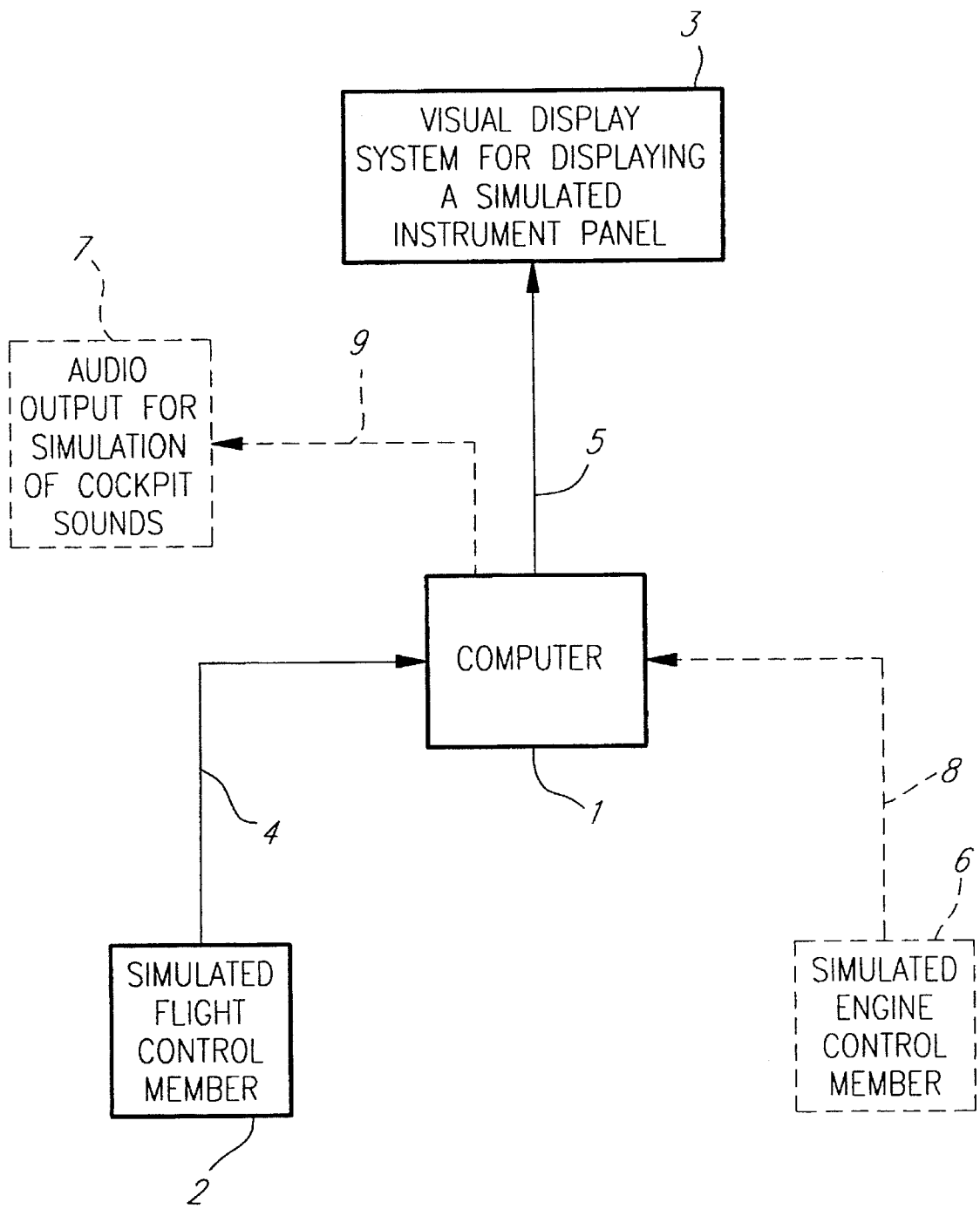
FIG. 1 is a block diagram of a flight simulation system in accordance with the present invention.

FIG. 1 generally illustrates a flight simulation system in accordance with the present invention. The system includes a computer 1, a simulated moveable flight attitude control member 2 and a visual display system 3 for displaying a simulated instrument panel. The computer 1 receives input signals 4 from the simulated flight control member 2 which reflect operation of the member 2. Computer 1 processes the information received from the control member 2 by means of an appropriate flight simulation program and produces an output 5 concerning simulated instrument readings which reflect operation of the control member 2. The output 5 is used to drive the visual display system 3 which displays simulated instrument readings such as those which relate to attitude, horizontal situation, altimeter, navigational readings and the like.

The system in FIG. 1 includes an optional flight control member in the form of a simulated moveable engine control member 6 which may be used to simulate the condition of the aircraft engines. The system also shows an optional audio output system 7 for simulating cockpit sounds (e.g. speakers or earphones). The computer 1 receives the input 8 from the control member 6 and again produces appropriate output concerning simulated instrument readings for display by the display system 3 and if the audio system 7 is present an appropriate output 9 to the audio system 7 for simulating audio effects such as engine noise.

FIG. 2 illustrates an example of an actual jet aircraft cockpit. The jet aircraft is not in flight i.e. it is appropriately parked; the aircraft may, for example, take on the general aspect or configuration of the parked aircraft shown in FIG. 1 of the above mentioned U.S. Pat. No. 5,009,598 (the entire contents of this patent are incorporated herein by reference). The pilot's flight control wheel is designated by the reference numeral 10. The simulated control members may, as shall be explained below, be removeable attached to wheel 10 such that the pilot may sit in the pilot's seat during the flight simulation training period.

FIG. 3 illustrates a simulated aircraft cockpit control system or device 11 obtainable from CH Products, Vista, Calif., U.S.A. under the trade name "Virtual Pilot". The simulated flight control device 11 is provided with a flight attitude control member 12 which comprises a wheel 13 and a column 14. Aircraft roll control can for example be simulated by rotating the wheel 13 in the directions of the arrow 15; rotation of the wheel 13 induces an appropriate signal which is transmitted to a computer (not shown). Aircraft pitch control can be simulated by gripping the wheel 13 and urging the column 14 away from or towards the trainee in the directions of the arrow 16; movement of the column 14 fore and aft likewise induces an appropriate signal which is transmitted to the system computer (not shown). The (unnumbered) cord or electric wire is the line used to deliver the output signal(s) of device 11 to a computer.

The control device 11 also includes a simulated throttle control member 17 which can be moved in the directions of the arrow 18 so as produce a signal output for a computer reflecting aircraft engine operation. The device 11 further includes trim control member 19 in the form of a control button; the button may be spring biased in a particular base operational configuration and may be urged into another configuration by being pushed; the device 11 being configured such that a signal for the computer is induced indicative of the simulated trim configuration.

FIG. 4 illustrates an example attachment or fastener means 20 for attaching the device 11 to the wheel 10 shown in FIG. 2. The attachment means 20 has a first belt element 21 comprising a buckle end 22 and a distal end 23. The buckle end 22 is provided with a conventional belt buckle and the end 23 is provided with conventional openings or holes for engagement with the belt buckle. The attachment means 20 also has a second belt element 24 which is fixed to the first belt element 21 in any suitable fashion (e.g. by adhesive, by stitching etc.). The second belt element 24 comprises a buckle end 25 and a distal end 26. The buckle end 25 is likewise provided with a conventional belt buckle and the end 26 is provided with conventional openings or holes for engagement with the belt buckle of the second belt element 24. The attachment means 20 also is provide with a C-shaped gripping member 27; the gripping member 27 has mouth 28 communicating with an opening 29. The gripping member 27 may be made of any suitable material which allows the mouth 28 to be expanded such that the gripping member 27 may be slipped over the arm portion of a control wheel (i.e. the portion of the wheel 10 shown in FIG. 2 and designated with the reference numeral 30). The opening 29 is of course sized such that the gripping member 27 may be caused to grippingly engage the portion 30 of a control wheel by engaging the buckle end 25 and the distal end 26 in conventional manner. The gripping member could for example be made out of a shoe heel with the center cut out. Any other type of fastening means could of course be used in place of the fastener shown in FIG. 4; e.g. instead of buckles a Velcro type hook and mat fastening system may be used.

Figure 5:
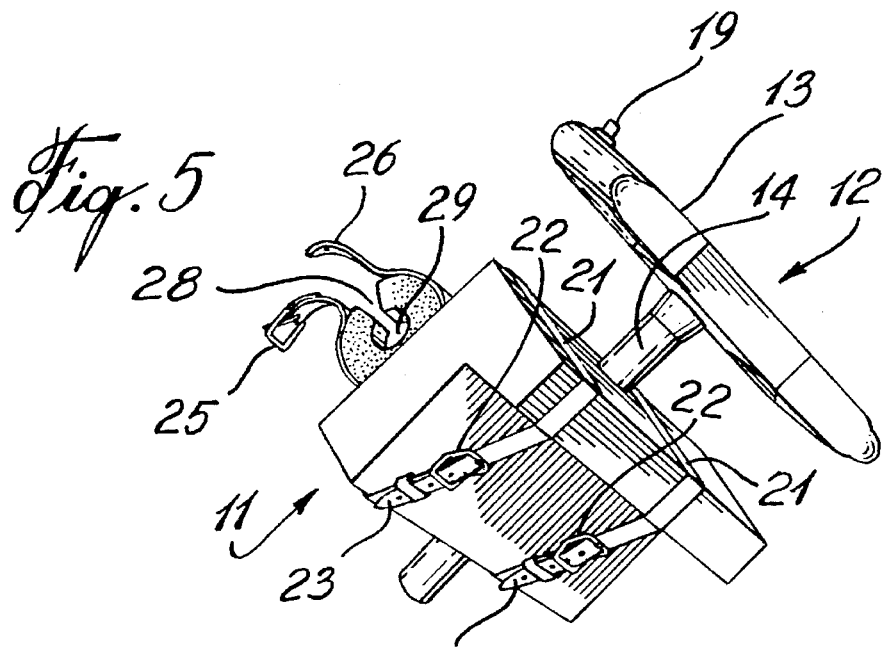
FIG. 5 is a schematic perspective bottom view of the control system shown in FIG. 3 and to which two attachment members as shown in FIG. 4 are attached.
Figure 6:
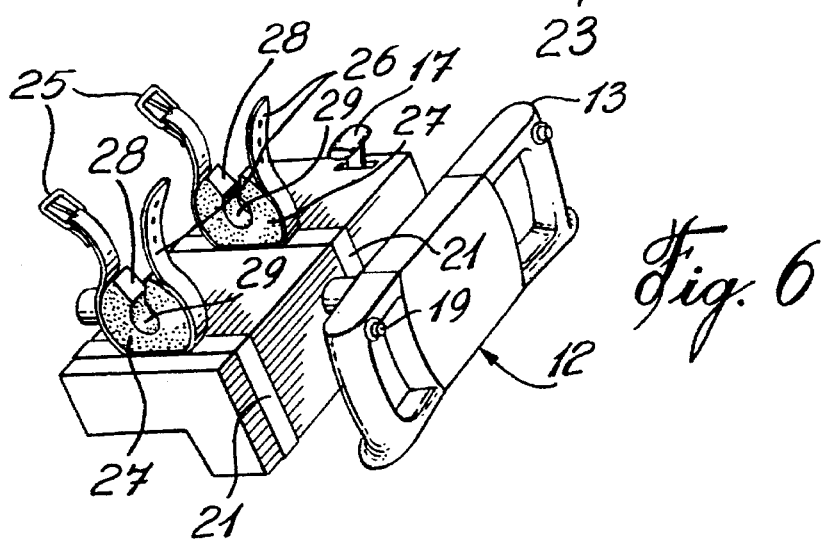
FIG. 6 is a schematic perspective top view of the control system shown in FIG. 3 and to which two attachment members as shown in FIG. 4 are attached.

Referring to FIGS. 5 and 6, these figures shows a device 11 around which is strapped two fasteners 20 as shown illustrated in FIG. 4. The fasteners 20 are strapped to the device 11 by respective first belt elements 21; as can be seen in FIG. 5 the first belt elements are buckled up tightly to the device 11.

Figure 7:
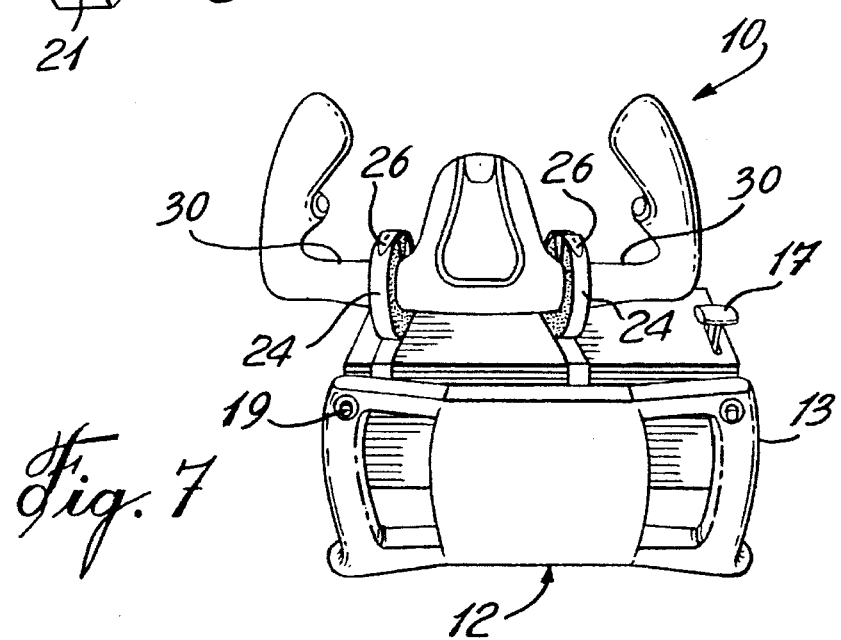
FIG. 7 is a schematic front view of the control system shown in FIG. 3 attached to an actual control wheel by two attachment means as shown in FIG. 4.

FIG. 7 shows the device 11 illustrated in FIGS. 5 and 6 snuggly but removeably attached to the wheel 10 at portions 30 (see also FIG. 2) by respective second belt elements 24. The two fasteners 20 are attached to the device 11 and the wheel 10 such that there is sufficient space between the column 14 of the device 11 and the column 32 of the actual flight attitude control member seen in FIG. 2 so as to allow back and forth movement of column 14. In order to remove the device 11 from the actual wheel the two fasteners holding it to the wheel 10 are unbuckled and the gripping members 27 are slipped off of the wheel 10.

Figure 8:
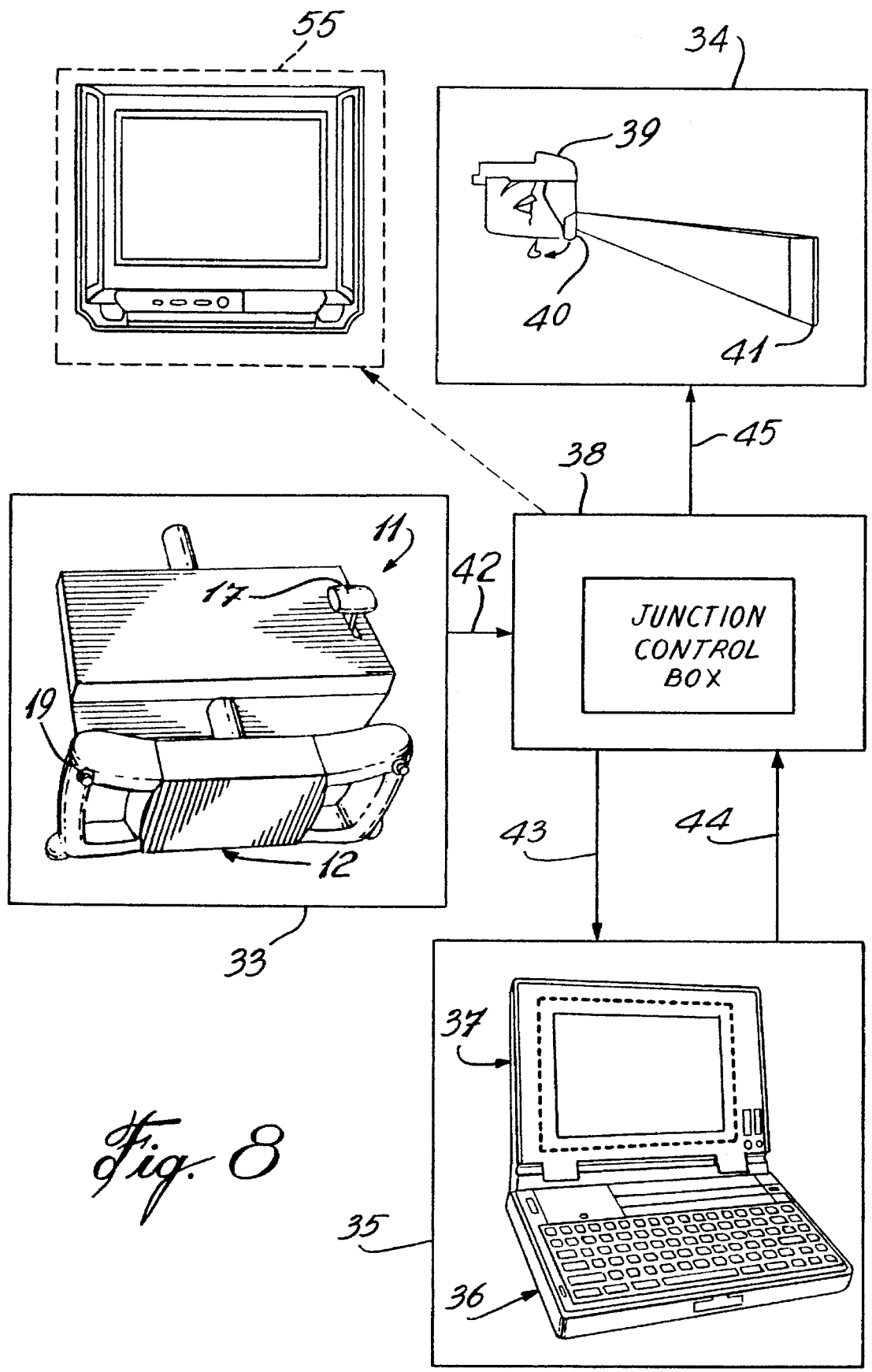
FIG. 8 is another block diagram of a flight simulation system in accordance with the present invention illustrating the various components thereof.

Referring to FIG. 8, illustrates in block and schematic fashion a simulator system in accordance with the present invention set up in the aircraft cockpit shown in FIG. 2 (the surrounding aircraft structure is not shown). The system includes a simulated aircraft cockpit control system 33 comprising a device 11 attached to an actual control wheel as described above, a head mountable display system 34 mounted on the head of a pilot trainee (only a portion of the trainee's face is shown), an instructor's station 35 comprising a (digital) computer 36 electrically attached to a separate video output screen 37, and a junction box 38 electrically linking the other elements of the illustrated system. The instructor's station is disposed where desired in the cockpit.

The display system 34 comprises the monocular "View 100" eyewear type video display system 39 mentioned above from Virtual Vision Inc. Redmond, Wash., U.S.A. The system 39 provides an image to a reflective lens 40 which provides to the eye of the wearer an image which appears to be at a predetermined distance from the wearer; the image is designated with the numeral 41. The View 100 requires an analogue signal to drive it (i.e. VHS/SuperVHS).

The junction box 38 is configured as both an analogue to digital signal converter and a digital to analogue converter; these functions may of course be provided by physically separate signal converters. The junction box 38 may, for example, be a composite device which comprise the analogue to digital converter provided with the device 11 referred to above, i.e. the simulated control system device called Virtual Pilot mentioned above. The junction box 38 may also include a digital to analogue converter (i.e. digital to VHS/SuperVHS) sold under the name Super Video Key from J.D.H., Taiwan; this latter converter can be used with a program called Super Video Key (obtainable from the same company) which allows a computer to display its output on more than one video display device.

The device 11 provides an analogue output signal 42 in response to trainee operation of the wheel control member 12 as described above. The device 11 also similarly provides analogue outputs reflecting trainee manipulation of the throttle control member 17 and trim control member 19. The computer 36 receives input from the device 11 though the intermedia of junction box 38. Thus, for example, the junction box 38 converts the analogue output signal 42 into a digital signal 43 which is passed on to the computer 36. The computer 36, loaded with the Elite Jet 3.0 simulation software referred to above, processes the digital input signal 43 and provides an appropriate (e.g. VGA) digital output signal 44 which is passed back to the junction box 38; the junction box 38 converts the signal 44 into an analogue signal 45 which is passed on to the head mountable display system 39 which in response thereto displays to the trainee simulated instrument readings such as for example, airspeed indicator readings, attitude indicator readings, altitude indicator readings, directional gyro readings, vertical speed indicator readings, and the like.

The instructor is able to follow the progress of the training session by watching the video screen 37.

Figure 9:
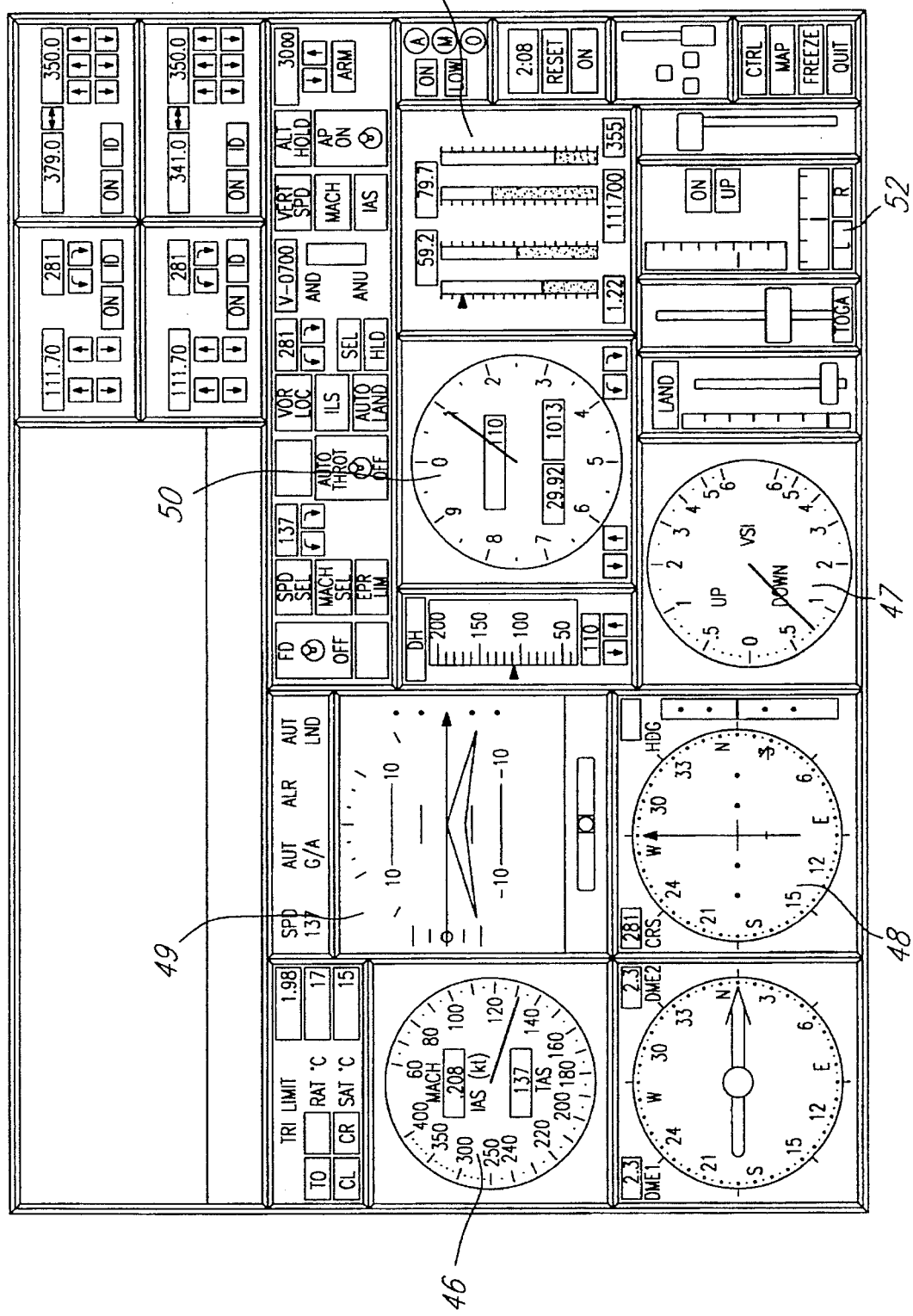
FIG. 9 is an illustration of a simulated instrument panel which may be generated in accordance with the present invention.

FIG. 9 shows an example of a simulated instrument screen which can be generated by the above mentioned Elite software. The simulated instrument panel includes, for example, an air speed indicator 46, vertical speed indicator 47, horizontal situation indicator 48, attitude indicator 49, altimeter 50, engine status panel 51 and trim system indicator 52.

Referring back to FIG. 8, the Figure illustrates an optional video display system in the form of a television/computer monitor which will receive appropriate signals from the junction box 38. However, the preferred visual display system is as mentioned above a head mounted system.

The power means for the simulator system shown in FIG. 8 may be a power source of the aircraft itself (e.g. onboard batteries). However, the power source for the computer and the other elements of the system is preferably supplied by a source independent of the aircraft; thus the computer, display system and wheel member may be battery powered or else an electric power line may be used which is connected to a power source outside of the aircraft.

The embodiments of the invention in which an exclusive property or privilege is claimed are defined as follows:

1. A flight simulator system comprising
   an actual aircraft not in flight;
   a simulated aircraft cockpit control system disposed in said aircraft, said simulated aircraft control system comprising one or more simulated moveable cockpit control members, each simulated moveable cockpit control member being capable of mimicking the movements of an actual aircraft control member, said simulated aircraft control system being capable of providing output control signals indicative of operation of said simulated moveable cockpit control members, said simulated moveable cockpit control members including at least a simulated aircraft flight attitude control member, said simulated flight attitude control member being capable of mimicking the movements of an actual aircraft flight attitude control member;
   a visual display system for receiving input signals and in response thereto visually display a video simulation of a plurality of simulated aircraft flight instruments mimicking the movements and responses of actual aircraft instruments;
   and
   a computer for receiving said output signals from said simulated control system and in response thereto for providing said input signals to said visual display system.

2. A flight simulator system as defined in claim 1, wherein said simulated moveable cockpit control members include a simulated moveable throttle control member, said simulated throttle control member being capable of mimicking the movements of an actual aircraft throttle control member.

3. A flight simulator system as defined in claim 1, wherein said simulated moveable cockpit control members include a simulated moveable trim member, said simulated trim member being capable of mimicking the movements of an actual aircraft trim member.

4. A flight simulator system as defined in claim 1 wherein said simulated control system is removeably installed in said aircraft.

\* \* \* \* \*